Nov. 1, 1966  C. T. CALFEE ETAL  3,282,216
NOSE CONE AND TAIL STRUCTURES FOR AN AIR VEHICLE
Filed Jan. 30, 1962  4 Sheets-Sheet 1

INVENTORS:
CLIFFORD T. CALFEE &
BY VIRGIL T. CALFEE

F. D. Copeland Jr.
AGENT

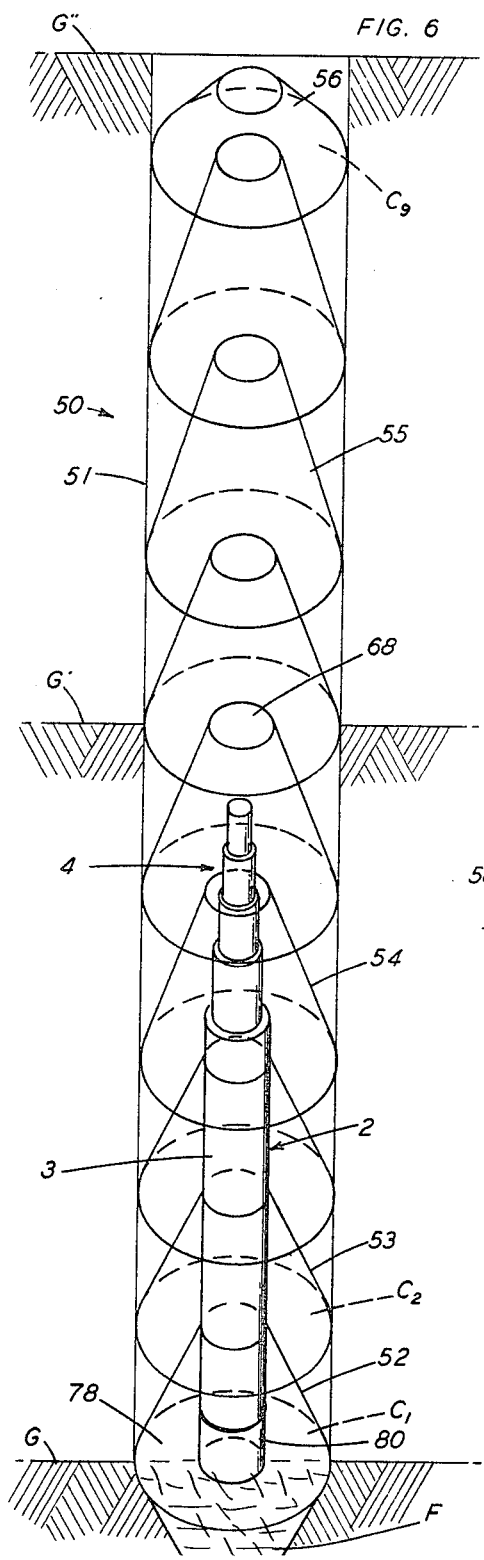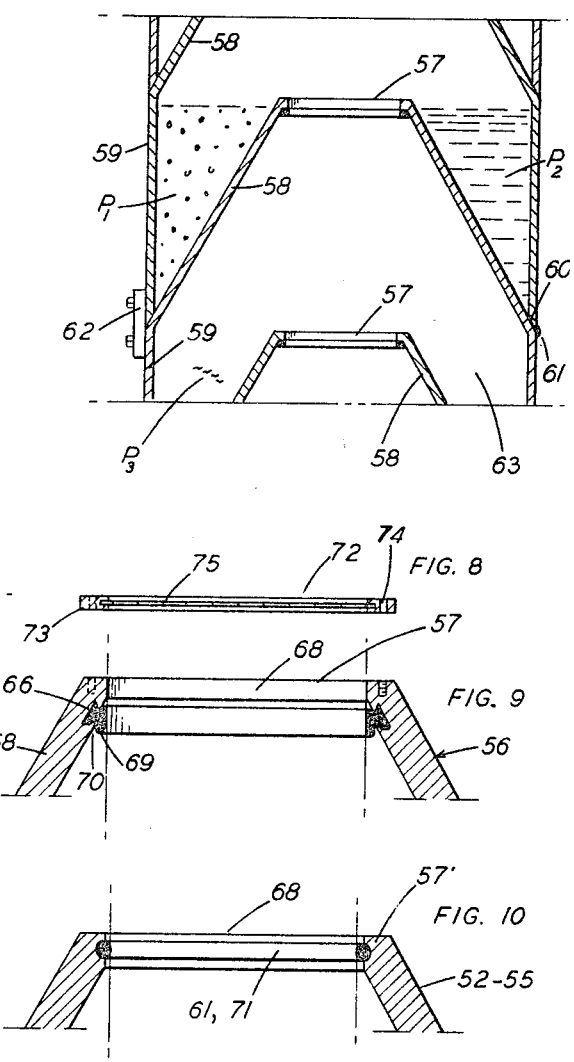

Nov. 1, 1966  C. T. CALFEE ET AL  3,282,216
NOSE CONE AND TAIL STRUCTURES FOR AN AIR VEHICLE
Filed Jan. 30, 1962  4 Sheets-Sheet 4

INVENTORS
VIRGIL T. CALFEE
CLIFFORD T. CALFEE
BY
F. D. Copeland Jr.
ATTORNEY

United States Patent Office 3,282,216
Patented Nov. 1, 1966

3,282,216
NOSE CONE AND TAIL STRUCTURES
FOR AN AIR VEHICLE
Clifford T. Calfee and Virgil T. Calfee, both of
3294 S. Polk St., Dallas, Tex.
Filed Jan. 30, 1962, Ser. No. 173,856
8 Claims. (Cl. 102—92.5)

The present application is a continuation-in-part of an application of the same inventors filed Mar. 19, 1958, Serial No. 722,546, now abandoned, and entitled, Method and Apparatus for Launching Missiles, and the drawings of that application are incorporated herein.

This invention relates generally to missiles and spacecraft in cases where the heat on the air vehicle due to friction between the air and the vehicle skin or surface structure may be objectionable.

This invention relates more particularly to vertical take-off missiles and other physical objects which are intended to travel in the atmosphere and beyond at high speeds and it is an additional object of this invention to provide a nose section (and similarly an airfoil section if applied to winged aircraft) which will permit the object to travel through the atmosphere with less heat transfer to the main body of the air vehicle than with conventional pointed or blunt nose designs.

This specification will not attempt to explain all of the scientific theories and axioms of all of the various phenomena and modification of the airstream involved in use of this invention, but many of the advantages here will be self-evident from the construction described. It must also be recognized that new scientific theories (and some old ones as well—e.g., the direction of an electric current) are often advanced as a tool to increase man's understanding of a happening and are not intended strictly and literally as factual dogma.

In the above mentioned earlier application, a series of unique stepped sections for non-rotating missile nose cones were disclosed. The nose cone sections shown in FIGURES 1–5 are all useful in sub-sonic and super-sonic missile construction. These nose cone sections will be useful for and will each provide slightly different results in the modification of the ambient airstream.

The advantage of providing a structure as shown in FIGS. 1–5 is that it utilizes the phenomena of removing layers of energy dissipation from the surface of a supersonic body; this phenomena is explained in the article entitled "A Review of Heat Transfer Literature 1959," by E. R. G. Eckert, J. P. Hartnett, T. F. Irvine, Jr., and E. M. Sparrow, in the August 1960 issue of the magazine entitled "Mechanical Engineering." In FIGS. 1a and 1b of page 51 of this article, the separation layers of fluid adjacent a slender cylinder having relatively sharp leading edges in the air stream is shown by schlieren photographs.

The present invention includes a substantially improved embodiment of the above mentioned invention, and this embodiment is shown in FIGURES 11–13, and it is an object of this embodiment to provide a missile nose cone (or air foil) section that will utilize the special configuration for substantial heat transfer advantages.

These and other objects and advantages will be apparent from an examination of the following specification and drawings in which:

FIGURE 6 is a pictorial schematic view of the assembled missile launcher and missile ready for firing.

FIGURE 7 is a fragmentary detail section elevational view of a cone section of the launcher of FIGURE 6.

FIGURE 8 is a cross sectional view of the frangible cap which is placed on the topmost cone section of FIGURE 1.

FIGURE 9 is an enlarged fragmentary detail sectional view of the top of the cone section of FIGURE 7.

FIGURE 10 is a modified embodiment of the sealing device shown in FIGURE 9.

Figure 1:
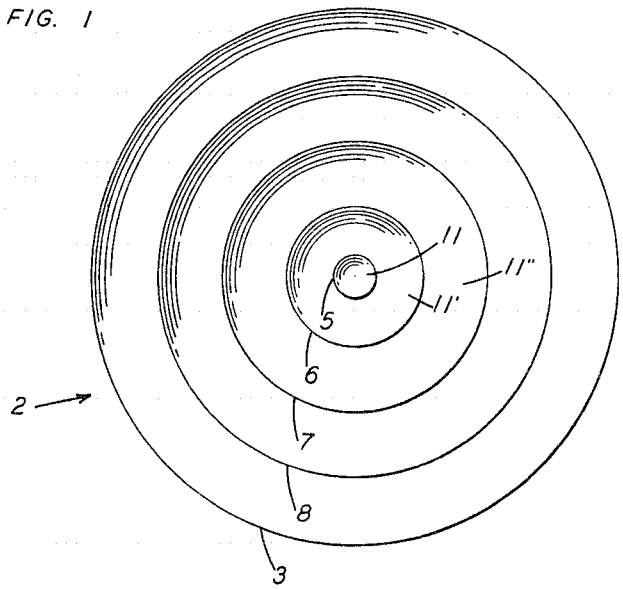
FIGURE 1 represents a top plan view of the forward or nose section of the missile of this invention.
Figure 2:
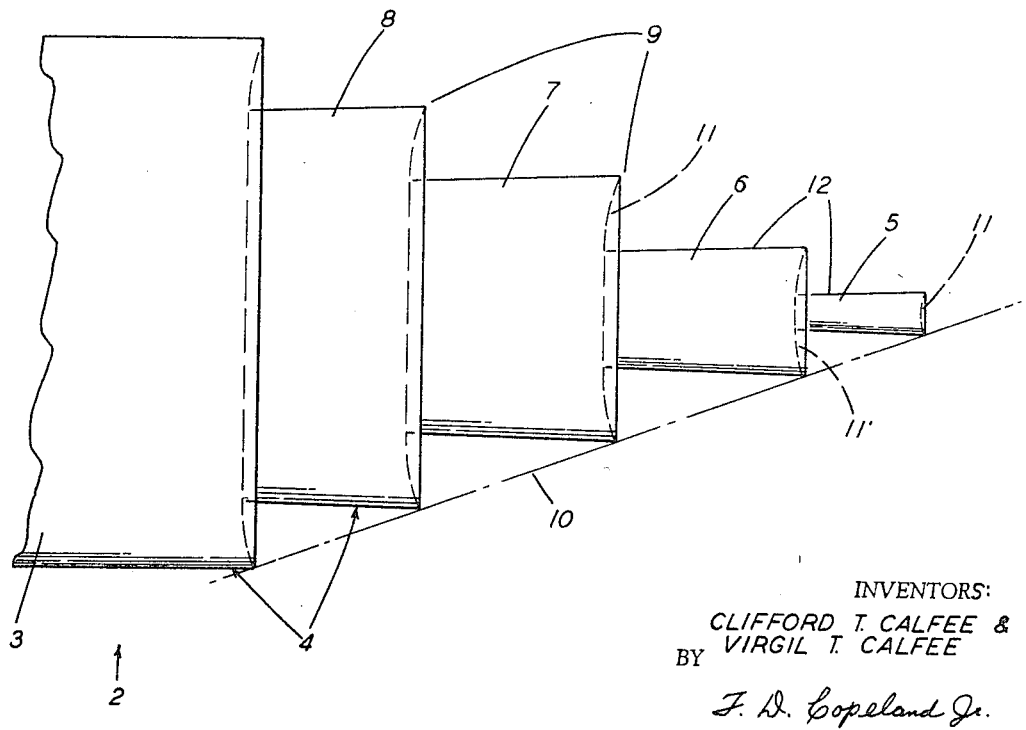
FIGURE 2 represents a side elevational view of the nose section of FIGURE 1.
Figure 5:
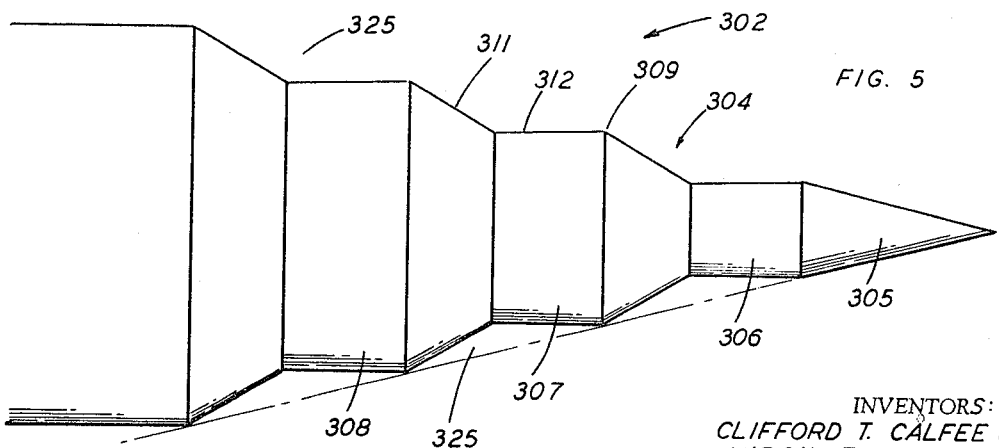
FIGURE 5 is a further modification of the device of FIGURE 4, which is specifically intended for use on missiles which will exit and subsequently re-enter a planet's atmosphere.

Referring now more particularly to the characters of reference of the drawing, it will be seen that by reference to the embodiment as shown in FIGURES 1, 2, and 5, the complete missile assembly identified at 2 consists basically of a conventional main body portion 3 and a unique nose section 4, which may be referred to as a nose cone, although, strictly speaking, it is not geometrically a cone at all, although its effect on the surrounding air at high speeds may be to produce a conical area of energy transfer surrounding the "cone."

The nose section 4 is constructed in a series of progressive steps 5, 6, 7, 8, and then the main body 3 forms the final step. The outer circumference or leading edge 9 of each step is aligned with each of the other edges 9 so that the edges of each step may be joined by a single straight line 10 as shown in phantom in FIGURE 2. Each individual step 5–8 is similar in constrction in that the forward or top section 11 is curved inward from the cutting edge 9 to form a dished out structure, and the circumferences 12 of each step are tapered inward in a rearward direction (on the order of 1–10° taper angle) so that the diameter of one step where it joins the next larger step is slightly smaller than the diameter at the forward end of that particular step. It is desirable to employ a relatively small diameter step 5 to tend to stabilize the straight line accuracy of the direction of travel of the missile 2.

Figure 3:
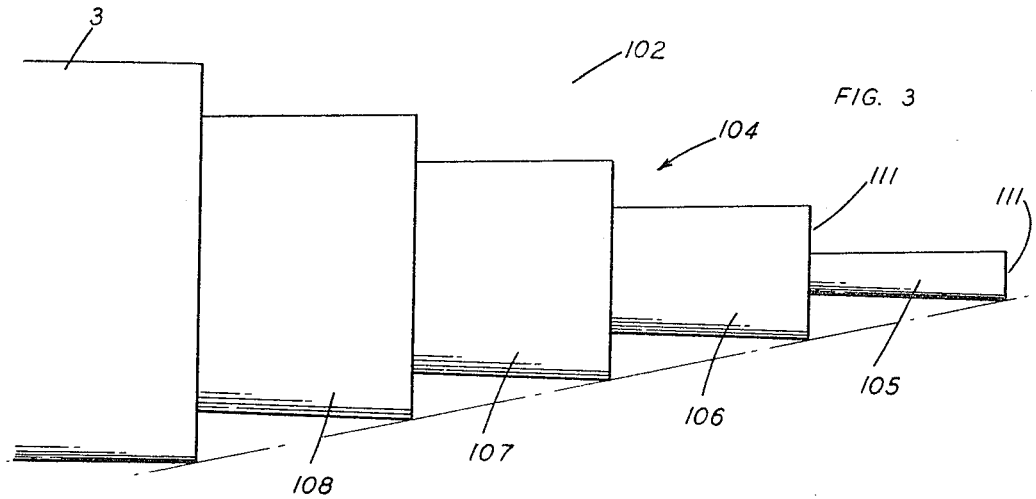
FIGURE 3 is a side elevational view of a modified nose cone portion of a missile of this invention.

In the embodiment shown in FIGURE 3, the nose section 104 is comprised of steps 105–108 similar to steps 5–8 of nose section 4, except that steps 105–108 have a flat forward or top section 111 to modify the effect of this missile on the air during flight.

Figure 4:
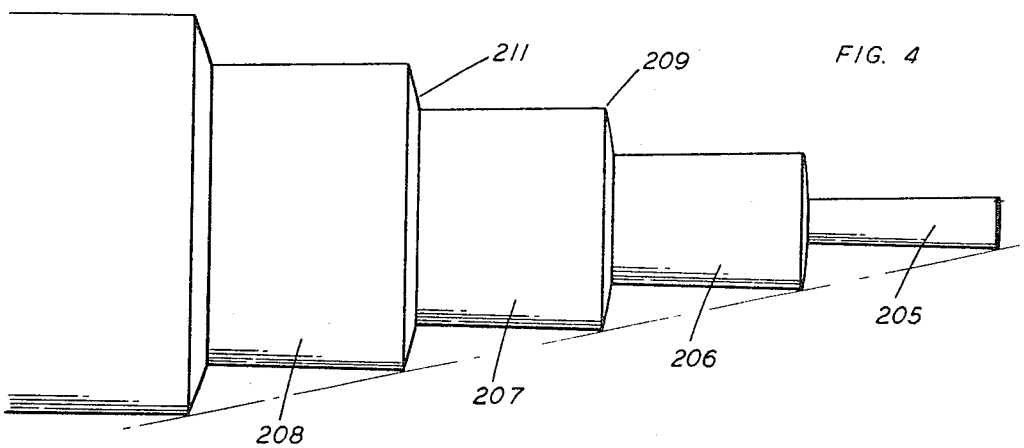
FIGURE 4 is a side elevational view of another modified nose cone.

In the embodiment shown in FIGURE 4, the nose section 204 is likewise similar to that shown in FIGURES 2 and 3, except the top section 211 of the steps 205–208 is a segment of a circle (the same circle) and becomes relatively flat toward the nose end, but the edges remain sharp.

In the embodiment shown in FIGURE 5, the nose section 304 has still a different functional configuration, but is also made up of steps 305–308, each having a relatively sharp forward edge 309 and a rearwardly tapering circumference 312. The top or forward sections here, 311, are radically tapered forward so that distinct triangular sections of open area as shown at 325 are formed.

Figure 11:
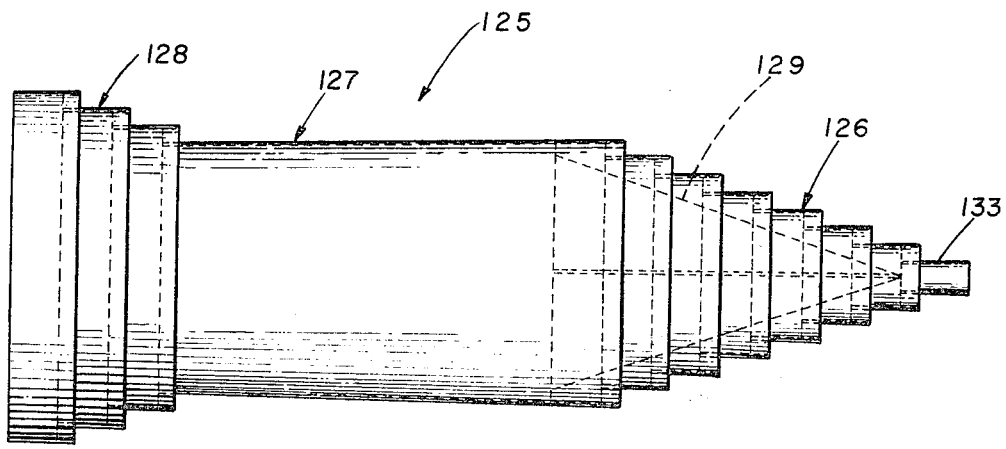
FIGURE 11 is a side or elevational view of a substantially improved embodiment for the missile nose cone structure of this invention.
Figure 12:
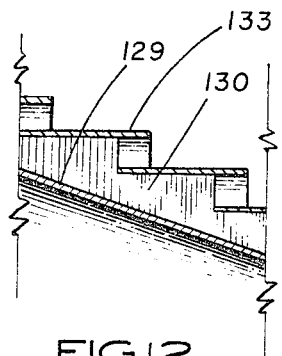
FIGURE 12 is an enlarged fragmentary detail sectional view of the ring support construction of FIGURE 11.
Figure 13:
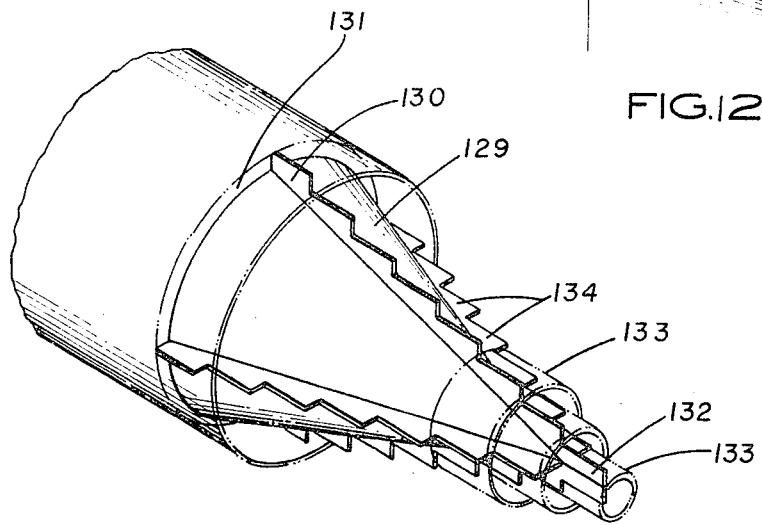
FIGURE 13 is a front perspective view of the nose cone section of FIGURES 11 and 12.

In the embodiment shown in FIGURES 11–13, missile 125 having a stepped nose cone section 126, a slightly rearwardly tapered cylindrical center section 127, and a stepped tail section 128 is seen to comprise a vehicle particularly adapted to avoid high surface heating effects in flight. The nose section 126 is similar in construction to the tail section 128 and both can be described best by reference to FIGURES 12 and 13. The forwardly tapered surface 129 of the missile is of a material and size to make it compatible with conventional vertical take-off missiles. Spaced around the periphery of the conical surface 129 are located a plurality of ribs 130 which are attached to the surface 129 and to the bulkhead 131 in a well-known manner. At least two of the ribs 130 may include a portion 132 which projects ahead of the conical surface 129 and provides a support for the first step ring 133. Each rib 130 includes a series of progressive step sections 134 having a horizontal and a vertical portion. Separate step rings 133a, 133b, etc., are installed over the horizontal portion of the corresponding step section and abut the vertical portion of the next larger step section. In this construction, by reference to FIGURE 13, it will be seen that the final missile will have the appearance and construction shown in FIGURE 11. It should also be noted that the external circumference of each ring is also slightly tapered in a rearward direction (less than about ten degrees). In FIGURE 12, it will also be seen that each larger ring 133 overlaps the next smaller ring in a longitudinal direction. Since the last vertical obstruction to the air flow is bulkhead 131, it may be envisioned that the tendency of the completed nose cone section of this embodiment will be to attempt to compress and trap a portion of the atmosphere at or near the forward end of the missile in flight. The generally cylindrical surface 127 extends forward and overlaps a portion of one of the step rings 133 so that it acts as the largest of the step rings. Each of the rings 133 may be tapered slightly toward the rear on their outer surface.

The complete vehicle embodying the novel construction shown in FIGURE 11 will have utility as a vertical take-off missile, a large diameter ICBM (intercontinental ballistic missile) or as a manned space capsule to be attached directly to the forward section of a vertical take-off missile for use in orbital or sub-orbital flight. The present space capsules require elaborate and expensive heat shields, usually beryllium or possibly titanium or alloys thereof to protect the surface and astronaut from the intense heat within the capsule due to air friction. A capsule made from the teachings of this invention could be constructed of thinner materials and would still produce a capsule that would not have as high an internal temperature in flight as the present capsules have, which is approximately 90° F. and higher.

The actual dimensions and relative proportions of the steps and surfaces shown in FIGURES 11–13 may be changed as a result of wind tunnel or preferably actual flight tests, but the relative proportions of the steps of a vehicle made in accordance with the teachings of this invention will always be substantially larger than serrations or grooves in the surface of the missile. The ribs 130 will be constructed as thin as practical to withstand the forces involved so that any heat transfer to the body of the missile itself will be at a minimum. The rings 133 will also be relatively thin for the same purpose. The longitudinal or center axis of this vehicle will usually coincide with the direction of travel of the vehicle. Hence, while the terms "forward," (or foremost), and "rearward" specifically refer to parts or positions relative to the tapered nose section and tail section respectively, they will for the most part, also indicate parts and positions relative to the direction of travel of the vehicle.

In FIGURE 6, the complete missile launching apparatus identified generally at 50, includes basically a vertically extending launcher 51 including a vertical missile 2 in operative installation therein.

The launcher 51 is made up of a plurality of cone sections 52, 53, 54, 55, 56, which are nested one above the other in that order in FIGURE 6. The complete stack of cones thus making up the assembled launcher 51 may be cemented or otherwise attached to the ground or bedrock at the surface as shown at G, or partially below the surface as shown at G', or wholly below the surface as shown at G". Each cone section 52–56 includes a central opening through a guide ring 57 at the top flat portion thereof. The conical sidewalls 58 taper downward from portion 57 until they reach the outer diameter dimension of the launcher 51 whereupon they pass downward in the form of cylinder 59. The extreme end 60 of each cylinder 59 then abuts the base of the conical section 58 of the next succeeding cone section. Adjacent cone sections may be welded as shown at 61 on the right side of FIGURE 7, or they may be bolted together by a reinforcing strap 62 as shown on the left side of FIGURE 7. The annular space identified at 63, surrounding the conical sidewalls 58 but below the top portion 57 is filled, as shown in FIGURE 7, with either a powder or solid propellant $P_1$ or a liquid propellant $P_2$, or the entire area between and around all of the available internal space may be filled with a combustible gas propellant $P_3$.

In order for the individual propellant chambers, identified as $C_1$, $C_2$, $C_3$, etc., to function properly and in stages, it will be necessary to seal them off from each other during their firing stage. This is accomplished by a high temperature sealing ring such as 66 shown in FIGURE 9 or 67 shown in FIGURE 10. The material for these rings may be any sealing material possessing the temperature and pressure requirements, such as asbestos. The ring 66 of FIGURE 9 is dove-tailed into the sidewall 58 slightly below and in alignment with the opening 68 of ring 57. The lower end 69 of ring 66 is normally curved outward to permit easy entrance of the missile body 3, but the ring 66 is cupped at 70 so that any pressure below the ring will assist in providing a leak proof seal against the missile body 3 when the latter is passing therethrough. In the modified construction shown in FIGURE 10, an "O" ring or "Quad" ring 71 is seated in the opening of the top ring 57' for the same purpose.

FIGURE 8 shows a flat circular disk-shaped cap 72 which is made up of a bolt ring 73 having a plurality of bolt holes 74 and including a central circular disk 75 of frangible material which may be easily ruptured by the first step 5 of the nose section 4 of the missile 2 when the latter is fired. The disk 75 is however strong enough to resist whatever pressures it may be subject to due to the upward movement of air or the gas pressure within the combined chambers $C_1$–$C_9$ when a gas propellant $P_3$ is used.

It will be noted that the vertical dimensions of the successive sections 52–55 increases with height so that approximately the same burning time will be allowed in each chamber even though the missile's speed has increased.

The nose section 4 of the missile 3 as shown in FIGURE 6 and as shown in enlarged detail in FIGURES 1 and 2 will permit the missile to partially remove the air from the launcher (ahead of the missile) as it begins its vertical rise. Also the launcher itself serves to guide the missile during the first short period of take off.

The missile 2 is equipped with a small initial firing section 80 which fires all of the chambers $C_1$–$C_9$ successively at take-off, and then drops off after it ignites the next propellant stage within the missile body 3.

What is claimed is:

1. In an air vehicle, a nose section, a main body portion, and a tail section, said main body section including an outer wall surface having a slight rearwardly and inward taper, each said nose and tail sections including a plurality of stepped outer wall portions, and each stepped portion decreasing in size toward the forward end of the vehicle.

2. In an air vehicle, a nose section comprising a conical surface, a plurality of spaced ribs including progressing step sections extending longitudinally along said surface, concentric rings of different sizes engaging said ribs at each step section in such a manner as to form a rearwardly increasing nose section and defining a trapped air space between the ribs.

3. In a cylindrical missile of substantial diameter, a nose section comprising: a conical surface extending forward, a bulkhead adjacent the rear of the conical surface, a series of concentric rings superimposed over and supported in spaced relation to said conical surface defining a trapped air space between said rings and said conical surface.

4. In a cylindrical missile of substantial diameter, a nose section comprising: a conical surface extending forward, a bulkhead adjacent the rear of the conical surface, means for superimposing a plurality of concentric rings over said conical surface in spaced relation therefrom, said rings being rearwardly staggered along said surface, each ring after the foremost ring overlapping a portion of the preceding ring and defining a trapped air space between the rings and the conical surface.

5. A stepped nose cone assembly for a missile, comprising: a generally cylindrical nose cone section having a smooth tapered forward surface, a plurality of longitudinally extending ribs spaced about the periphery of said surface, said ribs including a stepped side and having a straight side engaging said smooth surface, said stepped side extending radically outward from said cone section, a series of cylindrical concentric rings engaging the stepped side of said ribs to form a trapped air space between the rings and the smooth surface.

6. A means for trapping air at a missile body surface for reducing surface heating comprising: a series of concentric rings extending axially in a forward direction out from the surface of said missile, means to space at least a majority of said rings from the surface in a manner to provide an air space between the said rings and the missile body, and means associated with at least one of said rings to cause air between the rings and the missile body to be trapped and to increase in pressure when the missile acquires a velocity.

7. A means as in claim 6 wherein said rings are supported from said missile body by a plurality of stepped ribs and wherein said rings snugly engage said ribs in an overlapping relation to each other.

8. An air vehicle for travelling at high speeds through the atmoshpere comprising a main body portion having a longitudinal center axis extending through the body portion, a generally conical nose section having a series of stepped ring sections thereon, a bulkhead adjacent the rearmost stepped section of the nose section, and an intercommunication of trapped air between the stepped section adjacent the bulkhead and at least one other stepped ring section to reduce the direct contact of air friction heat with the generally conical nose section.

References Cited by the Examiner

UNITED STATES PATENTS

| 484,007 | 10/1892 | Haskell | 89—8 |
| 1,107,948 | 8/1914 | Hoagland | 102—91 |
| 1,298,447 | 3/1919 | Bradford | 89—8 |
| 2,103,155 | 12/1937 | Foulke | 102—92.5 |
| 2,345,619 | 4/1944 | Moore | 102—92.5 |
| 2,425,558 | 8/1947 | Ohlendorf | 102—3 |
| 2,495,304 | 1/1950 | Wyckoff et al. | 102—3 |

FOREIGN PATENTS

| 2,271 | 1859 | Great Britain. |
| 128,248 | 6/1919 | Great Britain. |

BENJAMIN A. BORCHELT, *Primary Examiner.*

SAMUEL BOYD, SAMUEL W. ENGLE, *Examiners.*